United States Patent [19]

Schlotterer

[11] 4,130,864
[45] Dec. 19, 1978

[54] PRIORITY SELECTION CIRCUIT FOR MULTIPORTED CENTRAL FUNCTIONAL UNIT WITH AUTOMATIC PRIORITY REDUCTION ON EXCESSIVE PORT REQUEST

[75] Inventor: John C. Schlotterer, Casselberry, Fla.

[73] Assignee: Westinghouse Electric Corp., Pittsburgh, Pa.

[21] Appl. No.: 736,798

[22] Filed: Oct. 29, 1976

[51] Int. Cl.² .......................... G06F 3/04; G06F 9/18
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,333,252 | 7/1967 | Shimabukuro | 364/200 |
| 3,399,384 | 8/1968 | Crockett et al. | 364/200 |
| 3,478,321 | 11/1969 | Cooper et al. | 364/200 |
| 3,573,856 | 4/1971 | Best et al. | 364/200 |
| 3,638,198 | 1/1972 | Balogh, Jr. | 364/200 |
| 3,798,591 | 3/1974 | Phillips et al. | 364/900 |
| 3,866,181 | 2/1975 | Gayman et al. | 364/200 |
| 3,919,692 | 11/1975 | Kronies et al. | 364/200 |
| 3,921,145 | 11/1975 | Emm et al. | 364/200 |
| 3,925,766 | 12/1975 | Bardotti et al. | 364/900 |
| 3,947,824 | 3/1976 | Doehle et al. | 364/900 |
| 3,949,371 | 4/1976 | Pederzini | 364/200 |
| 4,001,784 | 1/1977 | Bardotti | 364/200 |
| 4,009,470 | 2/1977 | Danilenko et al. | 364/200 |

*Primary Examiner*—Melvin B. Chapnick
*Attorney, Agent, or Firm*—C. M. Lorin

[57] ABSTRACT

A data processing system includes a shared functional unit having access and egress through a plurality of communication channels to several data handling units. The communication channels are multiplexed under control of a priority selection circuit normally arranged as a ladder from highest to lowest priority. Request signals for the various channels are each passed through a respective gate conditioned by a request enable device which is susceptible of being disabled whenever a select signal for that particular channel has been caused to serve the associated handling unit while channels of lower priority have request signals still demanding selection. When the request signal of lowest order at the time has been served, all request enable devices are reset in order to return to full priority selection.

5 Claims, 5 Drawing Figures

PRIORITY SELECTION CIRCUIT FOR MULTIPORTED CENTRAL FUNCTIONAL UNIT WITH AUTOMATIC PRIORITY REDUCTION ON EXCESSIVE PORT REQUEST

BACKGROUND OF THE INVENTION

The present invention relates in general to data processing for computer operations and/or computer-controlled industrial process operations. The practice has been to use a small data processor unit rather than a large and sophisticated computer for handling relatively complex digital data, whenever manageable. Several such small units have been combined in order to form a multi-processor system whenever data can be advantageously handled in a particular grouping by separate data processor units. The present invention involves more particularly a multi-processor system in which a central memory is used in common by several data processors. With such a system it is possible to take advantage of a common data pool located in shared memory without the complexity of moving the data pool between the individual data processors. In such instance, however, some priority scheme is necessary in order to arbitrate the access of the processors into the shared memory.

Priority schemes are known in the computer art which establish, on a selective basis and on request, a dialogue between several parts of a computer system. Thus, grouped input-output units, a number of memories, or a plurality of data processors, may be interconnected for a preestablished duration and by priority, singly, or in combination, with the other functional units of the system.

The priority schemes known in the prior art basically fall into one of the three following categories:

(1) Linear, or Top-down. With this scheme, the requests for interconnection are served from each port one at a time, in numerical order from the first to the last. This mode of selection is economical and sufficiently fast. However, when repeated requests from a high-priority port exceed the processing rate, all lower-priority ports are locked out until that series of requests is discontinued.

(2) Rotational priority. With this scheme, each port is served for one request only, and all ports are scanned in numerical order. Here, no port is capable of blocking others by continuous requests. However, due to the inherent sequential treatment, there is no weight assigned to any particular port for service. This scheme tends to be slow and complex, if high speed is required.

(3) Queue, or first in-first out. This scheme is inherently slower, and results in more complex circuitry. Also, it does not favor one port over another when it is desired.

From U.S. Pat. No. 3,478,321 it is known to provide priority storage acessing control for establishing a priority order between a plurality of units requesting access and a plurality of requested units in which the established order or priority is altered whenever under the highest priority access either the requested unit is busy or the unit controlling access to the requested unit is busy. The object with such system is to allow requests of lower priority to be processed whenever operation via a channel of higher priority has become temporarily blocked. It is known from U.S. Pat. No. 3,798,591 to provide a variable priority facility by rotating the priority order after each priority has been served thereby to give equal opportunity to each channel of a system comprised of requesting units multiplexed with a single port requested unit.

An object of the present invention is to provide a high speed priority system without increased complexity while giving priority to certain requests over other requests which have just been served.

Another object of the present invention is to provide a linear-type of priority which is automatically changed into a rotational-type of priority when the request rate of one device would cause a lower priority device to be prevented access.

SUMMARY OF THE INVENTION

The invention relates to a priority selector of a data processing system multiplexing a plurality of communication channels into a common single port. The priority selector responds to request signals from the units requesting access through the multiplexer and normally establishes a predetermined priority order. Whenever a second request signal for the port just served is received, the priority selector automatically modifies the priority scheme in order to satisfy requests of lower priority by preference. When such repeated requests for access are no longer received, or have reached the lowest priority in the original predetermined priority order, the system reverts to such predetermined priority order.

More specifically, the priority order is initially linear, and becomes rotational during successive requests for repeated services at each step of the linear scale. The invention is applicable to a data processing system multiplexing a plurality of central processor units for access to a common or central memory. The invention is also applicable to multiplexing of a plurality of peripheral input/output units with a common central processor unit. The invention is applicable to access for communication of data to be stored or processed in either direction to or from the multiplexer.

DESCRIPTION OF THE PREFERRED EMBODIMENT

Figure 1:
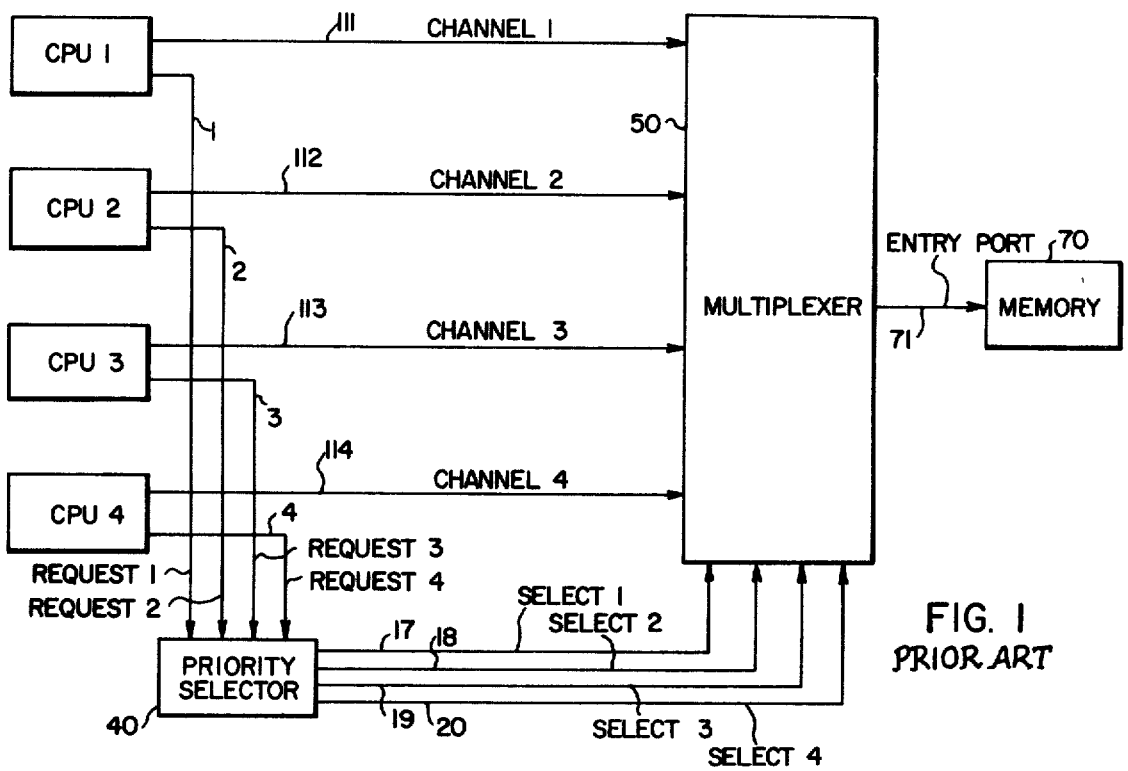
FIG. 1 shows a data processing system of the prior art with several communication channels multiplexed with a single port and selected by a priority selector, illustrated by central processor units having access to a common memory through a multiplexer.

Referring to FIG. 1, a data processing system is shown including four central processor units $CPU_1$-$CPU_4$ transmitting data through four channels via lines 111–114, respectively. Lines 111–114 provide inputs to a multiplexer 50 having a single output terminal connected to the entry port of a memory 70 via line 71. A priority selector 40 controlled by the request signals supplied on lines 1 to 4 by the respective units $CPU_1$-

CPU$_4$ generates via lines 17 to 20 select signals which establish access from the communication channels on lines 111-114 with line 71 through the multiplexer as generally known.

Figure 3:
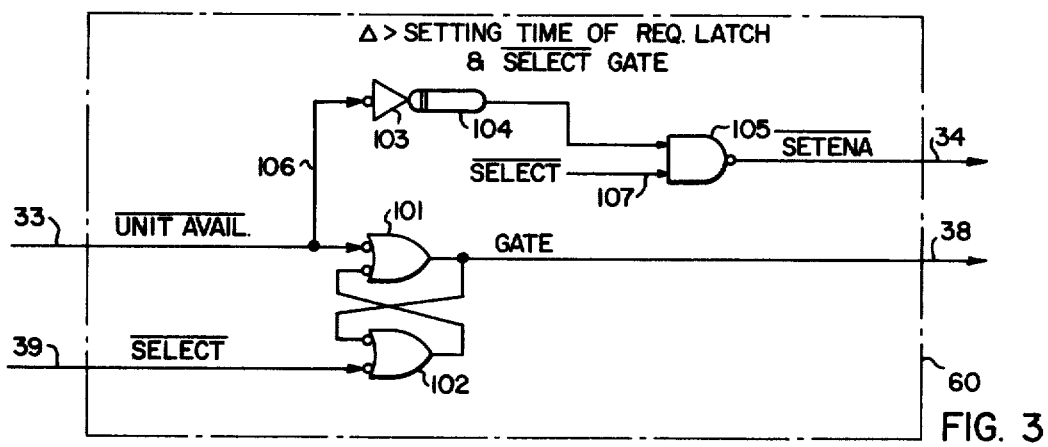
FIG. 3 shows in detail the control unit which is part of the priority selector of FIG. 2.
Figure 2:
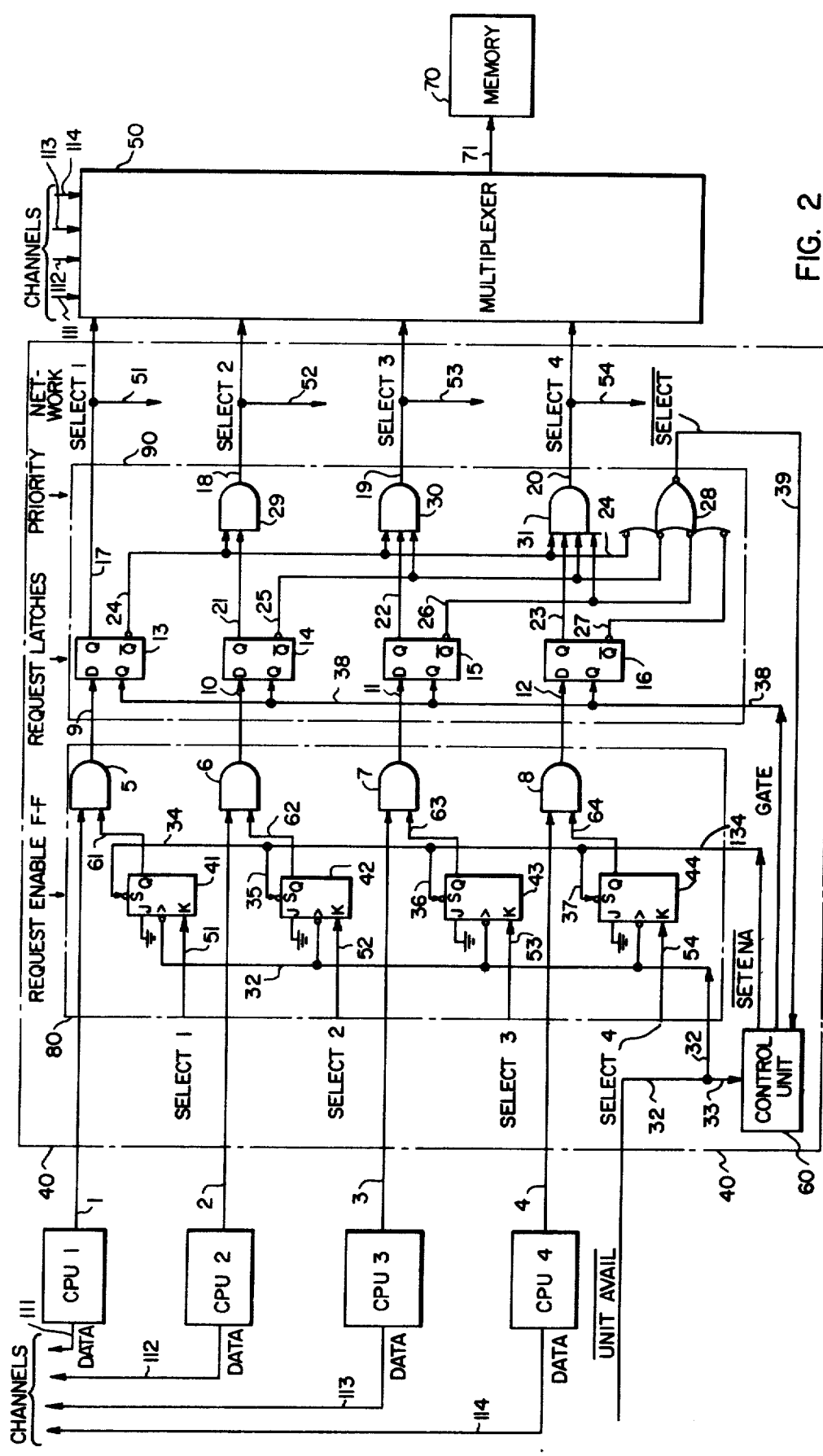
FIG. 2 shows the priority selector according to thhe invention.

The structural nature and the functions of the priority selector 40 according to the present invention are illustratively shown by FIGS. 2 and 3. The invention resides in a data processing system such as shown in FIG. 1 with a priority selector such as described and taught hereinafter by reference to FIGS. 2 to 5. It is well understood that FIGS. 2-5 are merely illustrative of a particular application of the present invention. It is clear that the priority selector according to the invention can be used in a data processing system where instead of a plurality of central processor units such as CPU$_1$ through CPU$_4$, a plurality of peripheral input/output devices are multiplexed as by 50 in FIG. 1 to a single central processor unit rather than a single memory such as 70 in FIG. 1.

Referring to FIG. 2, four central processor units CPU$_1$, CPU$_2$, CPU$_3$ and CPU$_4$ are shown operatively connected with a central memory 70 through a multiplexer (not shown) via channels of communication 111 through 114 for transmission of data in either direction. The priority selector 40 is shown to include a linear scale priority selector 90 controlled by a priority modifying circuit 80 and reset by a control unit 60. From each CPU, on respective lines 1, 2, 3, 4, is derived a request signal (REQ$_1$, REQ$_2$, REQ$_3$, or REQ$_4$). When access is requested by a particular CPU, the associated request signal is a ONE. This signal is derived from the CPU at the same time as an instruction word comprising address and data bits is made available, as generally known. In order that such instruction from one of the CPU's can reach the memory 70, the corresponding one of channels 111 through 114 must be connected via line 71 to the input of the memory unit 70. This is achieved by the priority selector 40 generating a corresponding select signal on one of the output lines 17 through 20 to control the multiplexer 5 for access through the particular channel.

For the generation of a corresponding select signal (select 1 through select 4 on lines 17 through 20), the priority selector provides four possible selection channels as follows:

(a) Line 1 from CPU$_1$, AND device 5, line 9, Request latch 13, and line 17

(b) Line 2 from CPU$_2$, AND device 6, line 10, Request latch 14, and line 18.

(c) Line 3 from CPU$_3$, AND device 7, line 11, Request latch 15, and line 19.

(d) Line 4 from CPU$_4$, AND device 8, line 12, Request latch 16, and line 20.

The request signal on one of the lines 1-4 is transformed into a select signal on one of the lines 17-20 whenever AND device 5, 6, 7 or 8 is gated by an associated input from line 61, 62, 63 or 64, and at the time the Request latch 13, 14, 15 or 16 is enabled from its gate input on line 38, with the exception that AND devices 29, 30 and 31 establish a linear priority network by cascade between the output lines 17, 21, 22 and 23 from the Q output of the Request Enable devices 13 and 16, respectively.

Although the preferred embodiment is described with a four-port priority network, the invention can be used for three ports or More. The circuit elements shown in FIG. 2 and FIG. 3 are only illustrative. Devices 41-44 may typically be each a dual J-K flip-flop with reset common clear and common clock, sold in the open market as a 7476 solid state device. Devices 13-16 are quad-latch flip-flops which may be dual D-type positive-edge-triggered flip-flop with preset and clear, known in the open market as a 7474 solid state device. The circuitry lends itself to implementation in medium scale integrated circuitry. By modular arrangement a large number of requests can be handled easily.

When AND device 5 is a one, device 13 assumes on line 17 a one (Q) and on line 24 a zero ($\overline{Q}$) when the gating signal appears on line 38. The same can be said of AND devices 6, 7, or 8 in relation to device 14, 15, or 16 for output lines 21, 25; 22, 26 and 23, 27. However, line 24 from the $\overline{Q}$ output of device 13 of the first channel is inputted to each AND device 29, 30, and 31 of the other channel. Similarly, line 25 from the $\overline{Q}$ output of device 14 of the second channel is inputted to each of the NAND devices 30, 31 of channels three and four. Line 26 from the $\overline{Q}$ output of device 15 of the third channel is inputted to the NAND device 31 of the fourth channel. As a result, whenever a request signal for a preceding channel has been setting one of the first three channels on line 17, 21, or 22, the associated $\overline{Q}$ output will prevent passing through NAND device 29, 30, or 31 of any Q output among the channels of lower order 2, 3, or 4. In other words, devices 29, 30, 31 in combination with devices 14, 15, and 16 together establish a linear scale of priority in the order of channel 1 through channel 3. Circuit 90 establishes a predetermined priority order for accepting request signals 1 through 4 on lines 1 through 4 and generating select signals on lines 17 through 20 for access of channels 111 through 114 to the memory 70 via multiplexer 50. It is with such priority order 1 through 4 that the request signals are arbitrated at the moment of transfer by the gate signal appearing on line 38.

Considering the priority modifying circuit 80 it is observed that AND devices 5, 6, 7 or 8 are passing a request signal from line 1, 2, 3, or 4 only if the associated Request Enable device 41, 42, 43 or 44 by its output 61, 62, 63, or 64 permits. The Request Enable device, normally in the enable state, is disabled when a select signal has been outputted on lines 17, 18, 19, 20 in the same channel, owing to connections 51, 52, 53, 54 feeding back the last output state of devices 13 through 16 to the K input of the Request Enable device (41, 42, 43, or 44) of the same channel. As a result, whenever a request signal follows another request signal which has just been served by device 13, 14, 15 or 16, device 5, 6, 7, or 8 will prevent another selection in the same channel. When this occurs, the corresponding channel across circuits 80 and 90 is actually cut-off, and device 13, 14, 15 or 16 for that channel remains with a zero on the associated line 17, 21, 22, or 23, indicating no selection and no access to the memory 70. While priority imposes an order of preference between channels which will block repeated access from the highest priority down when request signals appear on the left side, ultimately all devices 13, 14, 15, 16 may assume altogether the unlatched state. In order to reset the circuit in operative condition an AND device 28 (represented in FIG. 2 as using negative logic, e.g., low-true) is provided having inverted inputs from all lines 24, 25, 26, 27, so that a signal $\overline{\text{SELECT}}$ is generated when all latch devices are unlatched (as it is normal at the start of the operation) to reset all Request Enable devices 41 through 44 via line 134 and respective lines 34, 35, 36, 37 to the S-pins thereof thereby to restore communication in each channel between circuit 80 and circuit 90. To this effect, however, referring to FIG. 3, control unit 60 is used to generate the reset signal $\overline{\text{SETENA}}$ applied at the S input of each Request Enable device. When the memory 70 is available to provide access with one of the CPU's a $\overline{\text{UNIT AVAIL}}$ signal is generated appearing on line 32 which is inputted by line 33 to the Control Unit 60 as shown in FIG. 3, and also used to gate each Request Enable device via the same line 32.

Referring to FIG. 3, two NAND devices 101 and 102 are shown interlocked at one input by the output of the other to form a S-R flip-flop, and responsive by the second input to signal $\overline{\text{UNIT AVAIL}}$ on line 33 for device 101, and to signal $\overline{\text{SELECT}}$ on line 39 for device 102. The gate signal is generated by the output of device 101 on line 38. Thus, the gate signal is generated provided $\overline{\text{UNIT AVAIL}}$ goes low, e.g. the memory device is ready to receive information. At this time, if device 28 does not have all the $\overline{Q}$ values of devices 13, 14, 15, 16 as a ONE, line 39 carries a $\overline{\text{SELECT}}$ signal which is ZERO. As a result, the gate signal at the output of device 101 is unaffected by the state of device 102.

Considering the upper portion of FIG. 3, signal $\overline{\text{UNIT AVAIL}}$ from line 33 is applied to line 106 as an inverted input to inverter 103, then applied, through a delay 104 introducing a time delay $\Delta$, in supplying a first input to a NAND device 105. The latter has the $\overline{\text{SELECT}}$ signal as second input on line 107. The NAND device 105 generates signal $\overline{\text{SETENA}}$ on line 34 when the $\overline{\text{UNIT AVAIL}}$ signal goes low and after the delay $\Delta$, provided at that time signal $\overline{\text{SELECT}}$ is a ONE, which occurs when all of the inverted inputs to the AND device 28 have become a ONE (e.g. $\overline{Q}$ on all pins of devices 13, 14, 15, 16 are a ONE).

It appears that, according to the present invention, the ladder of priorities defined by AND devices 29, 30, and 31 is modified after one of the requests on lines 1, 2, 3, or 4 has been served, e.g. after a corresponding port 1, 2, 3 or 4 has been selected by the select signal: select 1, select 2, select 3, or select 4, on line 17, 18, 19, or 20. As shown in FIG. 2, each of the select signals (select 1, select 2, select 3, and select 4) is applied via respective lines 51, 52, 53, and 54 as an input to the K pin of respective flip-flop devices 41, 42, 43, and 44. Each of these flip-flop devices is operatively conditioned by a $\overline{\text{UNIT AVAIL}}$ signal derived from the memory which, on line 32, enables the flip-flop devices 41, 42, 43, 44 at the moment latching of the requests into one of latches 13, 14, 15, or 16 is permitted. When such an enabled flip-flop device concurrently receives one of the select signals on lines 51, 52 53, or 54, a Q state is established on line 61, 62, 63, or 64 which prevents the associated AND devices 5, 6, 7, or 8 from transferring a further request from line 1, 2, 3, or 4 to line 9, 10, 11, or 12. In such case, device 41, 42, 43, or 44 is said to disable AND device 5, 6, 7, or 8 so that a request from a CPU can no longer set the corresponding request latch. Therefore, in the ladder defined by AND devices 18, 19, 20, the result will be the same as if there were no request for such a channel. The ladder will still be operative to establish a priority between the remaining channels.

A final condition will be reached when any request line 1, 2, 3, 4 that is active has its corresponding disable flip-flop 41, 42, 43 and 44 set, so that the outputs of all AND devices 5, 6, 7 and 8 are zero. When this is the case, none of the select signals on lines 17, 18, 19 and 20 are a one at the moment the gate signal is being generated on line 35 and $\overline{\text{SETENA}}$ 34 occurs setting all request enable flip-flops 41-44.

As a result, the priority modifying circuit 80 is reset, and requests may again appear on lines 9, 10, 11, 12 as inputs to the linear scale priority network 90 which will respond to requests occurring from the CPU's in the order established by the linear priority 18, 19, 20.

To summarize:

The priority selector 40 of FIG. 2 (comprised of a priority modifying circuit 80 and a linear priority selector 90), receives requests from each port and generates a single port select signal (select 1, select 2, select 3 or select 4 at a time). A request signal is made ineffective to be converted into a select signal unless the associated enable flip-flop 41, 42, 43 or 44 is set. At the completion of the memory cycle, the request enable flip-flop for the port just serviced is reset by the select signal. All request enable flip-flops are set if no enabled port is requesting, which occurs either when no request signal has been applied on lines 1-4 from the CPU's, or when all AND devices 5-8 outputs are zero. This is due to the fact that whenever one of these two conditions occurs, control unit 60 will generate on line 34 signal $\overline{\text{SETENA}}$ as a ONE, as appears from a consideration of the control unit 60 of FIG. 3.

Figure 4:
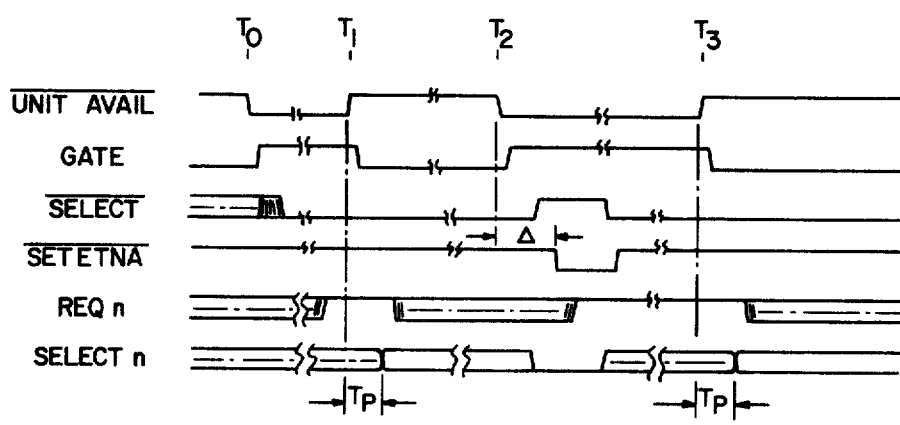
FIG. 4 provides a series of curves explaining on a time scale the relation between the control signals of the circuit of FIG. 2.

Operation of the request selection circuit of FIGS. 2 and 3 through several memory cycles can now be considered by reference to FIG. 4. At time $T_0$ when $\overline{\text{UNIT AVAIL}}$ goes low, it is assumed that, as the initial stage, all request enable flip-flops 41, 42, 43 and 44 are set. Therefore, the Q pin establishes on lines 61, 62, 63 and 64 a one.

The two last curves of FIG. 4 show, respectively, the request signals (Req. 1 - Req. 4) as they occur at the input of the request selection circuit and the select signals (Select 1 - Select 4) as they are actually generated at the output of the request selection circuit.

From $T_0$ to $T_1$ $\overline{\text{UNIT AVAIL}}$ is low (active). During such time interval, of all the request signals applied from the CPU's on lines 1-4 propagate through the request latches 13-16 to the priority network 90. The $\overline{\text{SELECT}}$ signal on line 39, when low, indicates to the memory that one or more request latches are set, indicating a request for service from at least one CPU. The memory responds to $\overline{\text{SELECT}}$ by raising $\overline{\text{UNIT AVAIL}}$. This causes the priority circuit to arbitrate between the existing CPU requests and output a single port select 51-54.

When the memory has performed a memory cycle, for instance after Req. 2 on line 2 from $CPU_2$ has been honored on line 18 and port 2, the $\overline{\text{UNIT AVAIL}}$ signal on line 32 becomes low. At that moment, the select 2 signal of line 18 is being applied on line 52 to the K pin of flip-flop device 42, which transfers to the disable state. A zero appears on line 62 to the AND device 6 which therefore can no longer transfer a Req. 2 signal.

When the memory raises $\overline{\text{UNIT AVAIL}}$ the request selection circuit arbitrates all present requests except Req. 2, since the enable circuit 80 by flip-flop device 42 has disabled the second channel. In the ladder circuit 90, latch device 15 may be the next channel to be enabled, provided there is a request on line 3, since the $\overline{Q}$ pin of latch device 14 generates on line 25 a zero, while the Q pin of latch device 15 would also generate zero as a second input to AND device 30. The same can be said of the subsequent channels, such as channel four or channel one, since a request could be latched on line 23 or line 17. But, as far as channel 2 is concerned, no request can make the Q pin of device 14 become a one, and therefore AND device 29 cannot pass the logic ONE of select 2 on line 18. It is observed that between the effective channels a race takes place which is won by the channel of higher order, since an effective Q pin on a device such as 13, 14, 15, 16 will generate a blocking state on the pin $\bar{Q}$ for all AND devices of lower order.

When at least one of the latch devices is set, AND device 28 operates as an OR device and generates a SELECT signal on line 39 to the control unit 60. Therefore, when the UNIT AVAIL signal goes true (low), signal $\overline{SETENA}$ on line 134, will not occur unless no request latch is set. When $\overline{UNIT\ AVAIL}$ goes high in response to a select priority, settling time $T_p$ is allowed for the fixation of the priorities by any of the latch devices.

The priority settling time $T_p$ always occurs after the $\overline{UNIT\ AVAIL}$ signal goes false (times $T_1$ and $T_3$). The $\overline{SETENA}$ signal occurs whenever no select signal is caused to be generated by the gate signal on line 39. The selected port is free to change while signal $\overline{UNIT\ AVAIL}$ is true.

Figure 5:
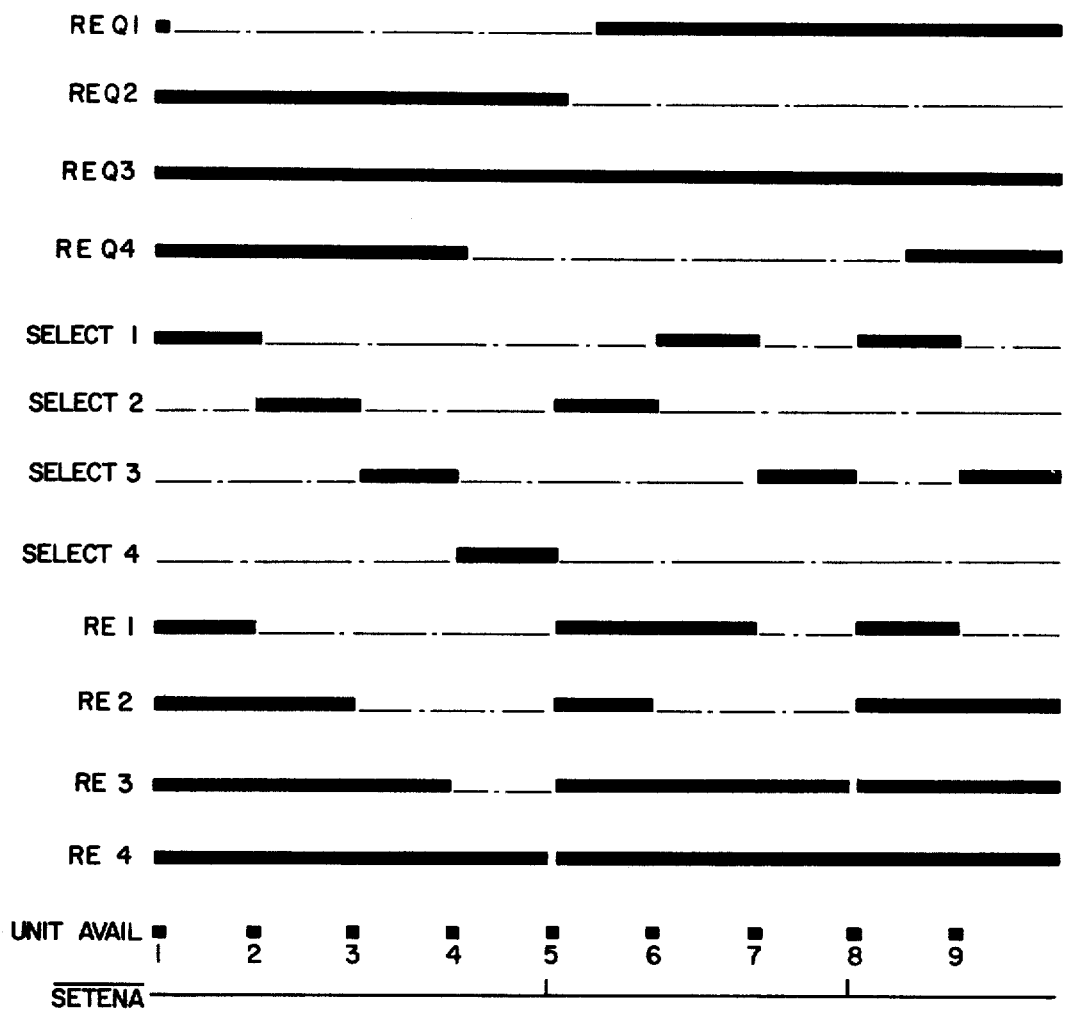
FIG. 5 illustrates the application of the priority selector according to the present invention during nine cycles under a typical succession of requests from the requesting units.

FIG. 5 shows as a function of time the state of the requests (Req. 1 - Req. 4) made by the CPU's, to or from the memory unit, and actual selections made by the priority network 90 (Select 1 - Select 4). The state of the enable circuit 80 appears from signals $RE_1$ - $RE_4$.

The penultimate line of FIG. 5 illustrates the memory cycles for nine periods. The last line of FIG. 5 shows the generated signal $\overline{SETENA}$. It appears that during the first four memory cycles rotational priority selection occurs from channel one to channel four. As the requests of the CPU's are being honored, the preceding channels 1, 2 or 3 are successively disabled ($RE_1$, $RE_2$, $RE_3$ as shown). At the end of the fourth cycle, the enable circuit 80 has in fact been disabled for all four channels. Therefore, signal $\overline{SETENA}$ is generated and all channels are again enabled. At that moment, there is no request for channel 1 or 4. Between signals Req. 2 and Req. 4, the priority circuit 90 arbitrates channel 2 (Select 2) and at the end of the period the enable circuit 80 is disabled for channel 2 ($RE_2$). When the sixth period starts, arbitration is between channels 1 and 3. Channel 1 wins the race (Select 1), and the enable circuit 80 is disabled for channel 1 ($RE_1$). When the seventh period starts, despite the fact that a request for channel still persists ($REQ_1$), since $RE_1$ is OFF, signal $REQ_3$ is the only one in contention in the priority ladder ($RE_3$). This request is honored. When the seventh period ends, $RE_1$ is still OFF, despite the presence of a request ($REQ_1$). Also $RE_3$ is OFF, since channel 3 has just been served. There is no request for the two other channels. Therefore, signal $\overline{SETENA}$ is generated, and the enable circuit 80 is being set altogether for the next period. During the eighth period, channel 1 being of the highest order obtains the priority. When $RE_1$ is set OFF at the end of the period, the third request ($REQ_3$) is the one honored in the absence of any request for channel 2, since $REQ_1$ has just been set OFF by signal Select 1.

The invention presents this original feature that priority of requests is determined by the memory, not by the central processor unit. It is a priority network associated with the memory which arbitrates between the central processors which one shall be next for the oncoming memory cycle. The priority system according to the present invention initially establishes a linear order of priorities which is inherently contrived to be of the rotational type when request rates exceed memory bandwidth. It is observed that the system can easily be adapted to any number of ports greater than 2, by expansion of the network.

I claim:

1. In a data processing system having a central functional unit; a plurality of data handling units; a like plurality of sources of request signals associated with the respective said data handling units for requesting data access with said central functional unit; a like plurality of communication channels between said central functional unit and the respective said data handling units; and a priority selector for outputting select signals corresponding to request signals in a predetermined priority order, each of said communication channels being operative to provide data access when controlled by a corresponding outputted select signal; the combination of:

a like plurality of gating means operative in response to a request signal to provide a gated signal when enabled;

a like plurality of means for enabling said gating means, respectively, in response to a common availability signal generated by said central functional unit after each completion of an arbitration process by said priority selector; and a like plurality of means having a set and a reset position being provided for disabling in the set position a corresponding said enabling means when a corresponding select signal has been outputted by said priority selector;

whereby following at least one first request signal served by said priority selector in the presence of gating means having no request signal, an availability signal outputted by said central functional unit causes operation of said priority selector in relation to new request signals before any renewed such first request signal.

2. The system of claim 1 with means for resetting said disabling means in the absence of gated request signals at the input of said priority selector.

3. The system of claim 2 with said priority selector including a plurality of bistable means each for storing a gated request signal in one stable position; said resetting means being responsive to all of said bistable means being in another stable position.

4. The system of claim 3 with said priority selector including a plurality of means, each associated with one gating means and responsive to said availability signal, for synchronously converting such stored gating signal into a selectable request signal, said priority selector outputting select signals in relation to each such said selectable request signal between each successive availability signal.

5. The system of claim 4 with delay means following outputting of said availability signal to allow operation of said priority selector in response to each said selectable request signal.

* * * * *